United States Patent [19]

Weselak

[11] Patent Number: 5,054,186
[45] Date of Patent: Oct. 8, 1991

[54] CLUTCH ASSEMBLY METHOD

[75] Inventor: Mark R. Weselak, Franklin, Tenn.

[73] Assignee: Saturn Corporation, Troy, Mich.

[21] Appl. No.: 597,920

[22] Filed: Oct. 12, 1990

[51] Int. Cl.[5] .................... B23Q 3/00; B25B 27/14
[52] U.S. Cl. ............................... 29/467; 29/274;
29/434; 192/70.11
[58] Field of Search ............... 29/433, 436, 274, 464,
29/904, 434, 467; 192/70.11, 70.16, 70.19,
87.11, 110 R, 110 S

[56] References Cited

U.S. PATENT DOCUMENTS

| | | | |
|---|---|---|---|
| 3,099,875 | 8/1963 | Lelis | 29/274 X |
| 4,231,147 | 11/1980 | Witt | 29/433 |
| 4,640,294 | 2/1987 | Ordo | 192/87.11 |
| 4,910,856 | 3/1990 | Watanabe | 29/274 X |

FOREIGN PATENT DOCUMENTS 977135  11/1982  U.S.S.R. .................... 29/274

Primary Examiner—Joseph M. Gorski
Assistant Examiner—Peter D. Vo
Attorney, Agent, or Firm—Donald F. Scherer

[57] ABSTRACT

A clutch structure has a housing in which is slidably disposed a fluid-operated piston, a plurality of inner and outer splined friction plates and a return spring assembly. The friction plates have formed thereon a spline portion such that alternating discs have the splines extending radially outward, engaging the housing, or extending radially inward, away from the housing. The clutch structure is assembled by positioning the clutch housing in a fixture composed of a ring which is sized to accommodate the outer spline of the one set of friction plates. The plates are arranged in two vertical stacks with the inner splined plates in one stack and the outer splined plates in the other. The plates are alternately installed in the housing by descending from the stacks solely by the force of gravity until a desired number of plates have been installed. The piston and a pressure plate can be installed in the housing prior to mounting the housing to the fixture, if desired. The return spring assembly and a backing plate are installed in the housing after the clutch plates have been installed.

6 Claims, 5 Drawing Sheets

CLUTCH ASSEMBLY METHOD

BACKGROUND OF THE INVENTION

This invention relates to multi-plate clutch structures, and more particularly, to methods of assembling the clutch structure.

SUMMARY OF THE INVENTION

It is an object of this invention to provide an improved method of assembling a clutch structure, wherein a clutch housing with an installed piston is positioned on an assembly ring to receive alternate outwardly splined plates and inwardly splined plates that are slid from the bottom of respective vertical stacks into registry with the assembly ring and permitted to descent by gravity into the clutch housing.

It is another object of this invention to provide an improved method of assembling a clutch structure having a housing with a clutch cavity and a casing having a splined diameter and an axially facing opening, wherein a piston is slidably disposed in the cavity, the housing is positioned on an assembly ring with the axial opening facing upward, a pair of stacks of clutch plates are provided, the bottom plate of the stacks are alternately slid into vertical registry with the assembly ring and permitted to descend into the cavity and when the desired number of plates has been installed, the housing is removed from the assembly ring.

These and other objects and advantages of the present invention will be more readily apparent from the following description and drawings.

DESCRIPTION OF THE EXEMPLARY EMBODIMENT

Figure 4:
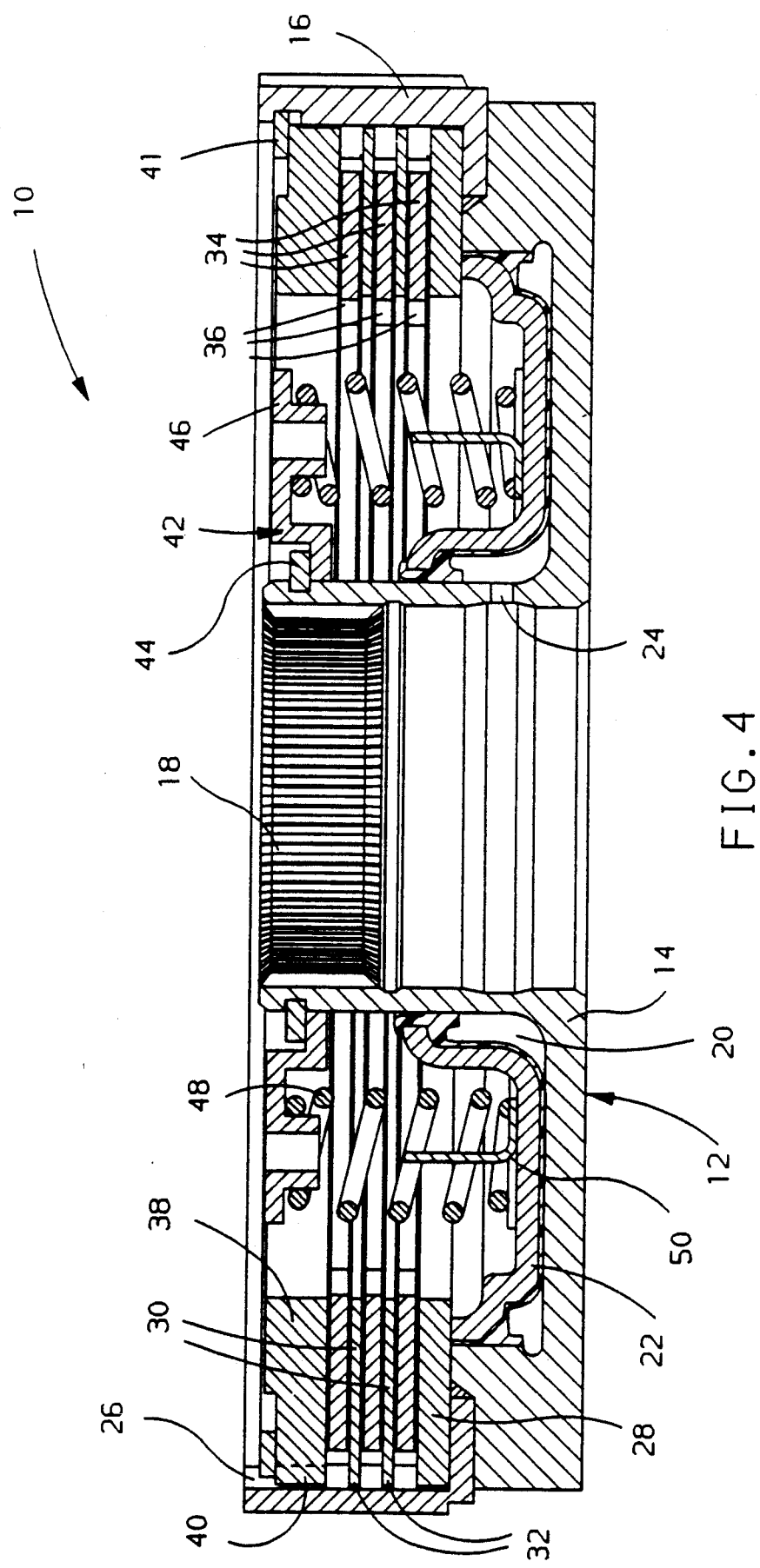
FIG. 4 is a clutch structure which is assembled using the present invention.
Figure 5:
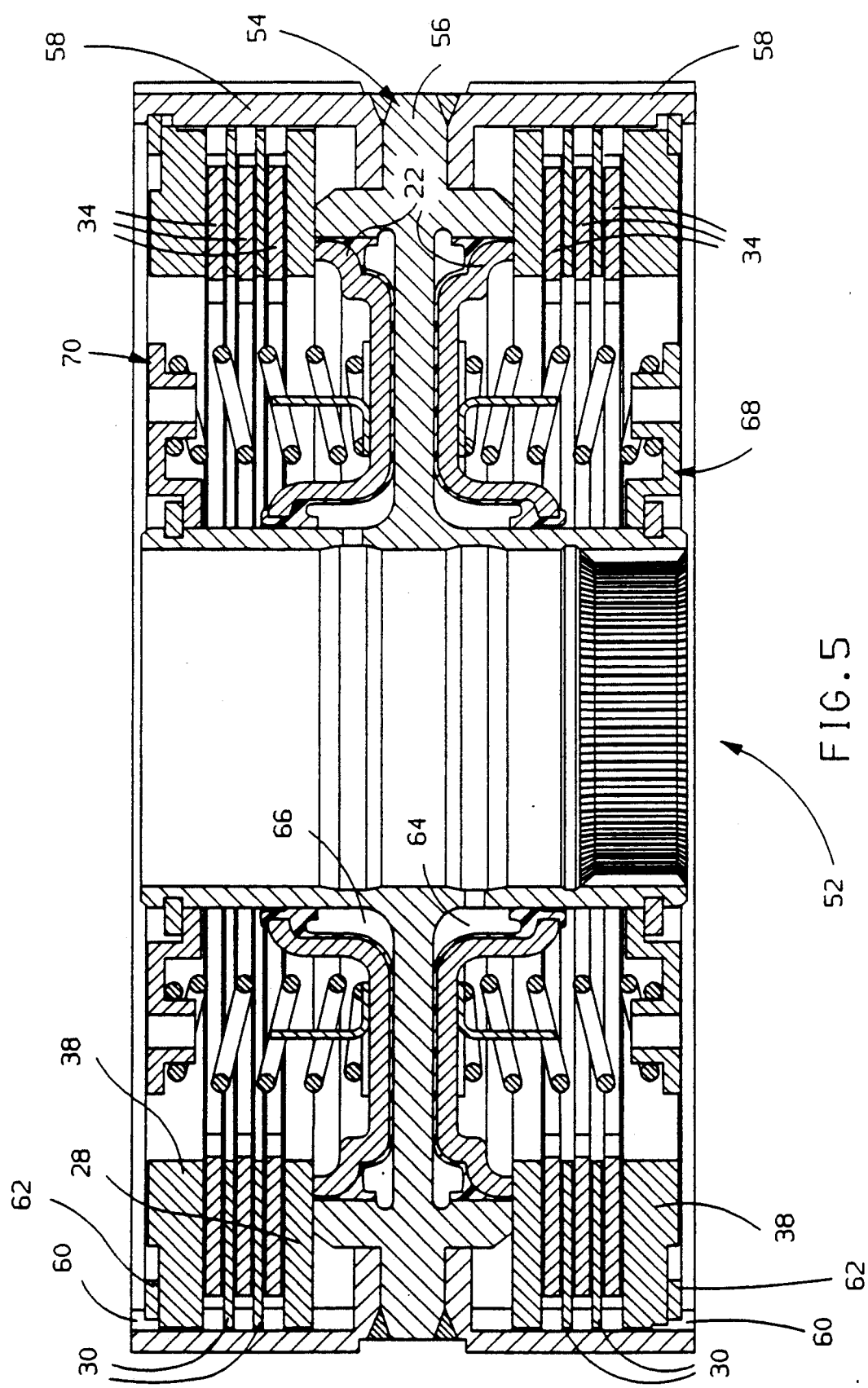
FIG. 5 is another clutch structure which is assembled using the present invention.

FIGS. 4 and 5 are cross-sectional views of clutches which have been assembled utilizing the present invention.

FIG. 4 has a clutch structure 10 which includes a clutch housing 12 comprised of a hub and cavity portion 14 and an annular extension 16. The hub and cavity portion 14 has formed thereon a drive spline 18 and an annular cavity 20 in which is slidably disposed a fluid operated piston 22. The cavity 20 can be filled with fluid through a passage 24. The fluid connections between a shaft, not shown, and the passage 24 are conventional structures, and those familiar with the clutch art will be aware of such devices.

The annular extension 16 has a splined inner surface 26 adapted to receive the splined pressure plate, 28 and a plurality of friction plates or clutch plates 30 which have radially outwardly extending spline portions 32 formed thereon. The spline portions 32 mesh with the splined surface 26 such that unitary rotation is always present between the clutch housing 12 and the friction plates 30.

Alternately spaced with the friction plates 30 is a plurality of friction plates or clutch plates 34 which have formed thereon a splined inner diameter 36. The splined diameter 36 is adapted to engage splines which are formed on a hub or gear member, not shown, such that during clutch engagement, conjoint rotation between the clutch housing 12 and the splined hub will occur. As is well known in the clutch art, this permits selective connection between a transmission input shaft and a gear member.

A backing plate 38 is also disposed in the clutch housing 12. The backing plate 38 has a splined outer diameter 40 which is adapted to mesh with the spline 26. The backing plate 38 is secured axially in the clutch housing 12 by an annular locking ring 41. A return spring assembly 42 is also secured axially in the clutch housing 12 by an annular locking ring 44. The spring assembly 42 includes an annular base plate 46 which supports a plurality of compression springs 48 which are disposed to abut a retainer plate 50, which in turn abuts the piston 22.

As is well known, the springs 48 urge the piston 22 in a direction to provide disengagement of the clutch structure 10, whereby the alternating plates 30 and 34 are free to rotate independently of each other. The introduction of pressurized fluid to the cavity 20 will cause the piston 22 to move axially against the springs 48 to urge the pressure plate 28 to compress the plates 30 and 34 together, whereby a frictional drive connection is provided between the alternating plates.

A clutch structure 52 is shown in FIG. 5. The clutch structure 52 differs from the clutch structure 10 in that two clutch assemblies are provided in a single housing 54. The housing 54 has a central support and cavity member 56 which has secured thereto a pair of annular shells 58 which are splined at their inner diameters 60 to provide a drive connection for the backing plate 38 and the alternately spaced externally toothed plates 30. The clutch structure 52 also includes a pair of backing plates 38 which are secured in their respective shells 58 by locking rings 62.

The central support and cavity member 56 has formed therein a pair of fluid chambers or cavities 64 and 66. Each of the fluid chambers 64 and 66 has slidably disposed therein a respective piston 22. These pistons are independently operable to provide engagement of the friction discs 30 and 34 to provide drive connections between the clutch structure 52 and either of two output devices, not shown.

It should be apparent that the clutch structure 52 is a dual clutch mechanism and therefore requires two return spring assemblies 68 and 70 which are identical to the spring assembly 42 described above for FIG. 4.

Figure 1:
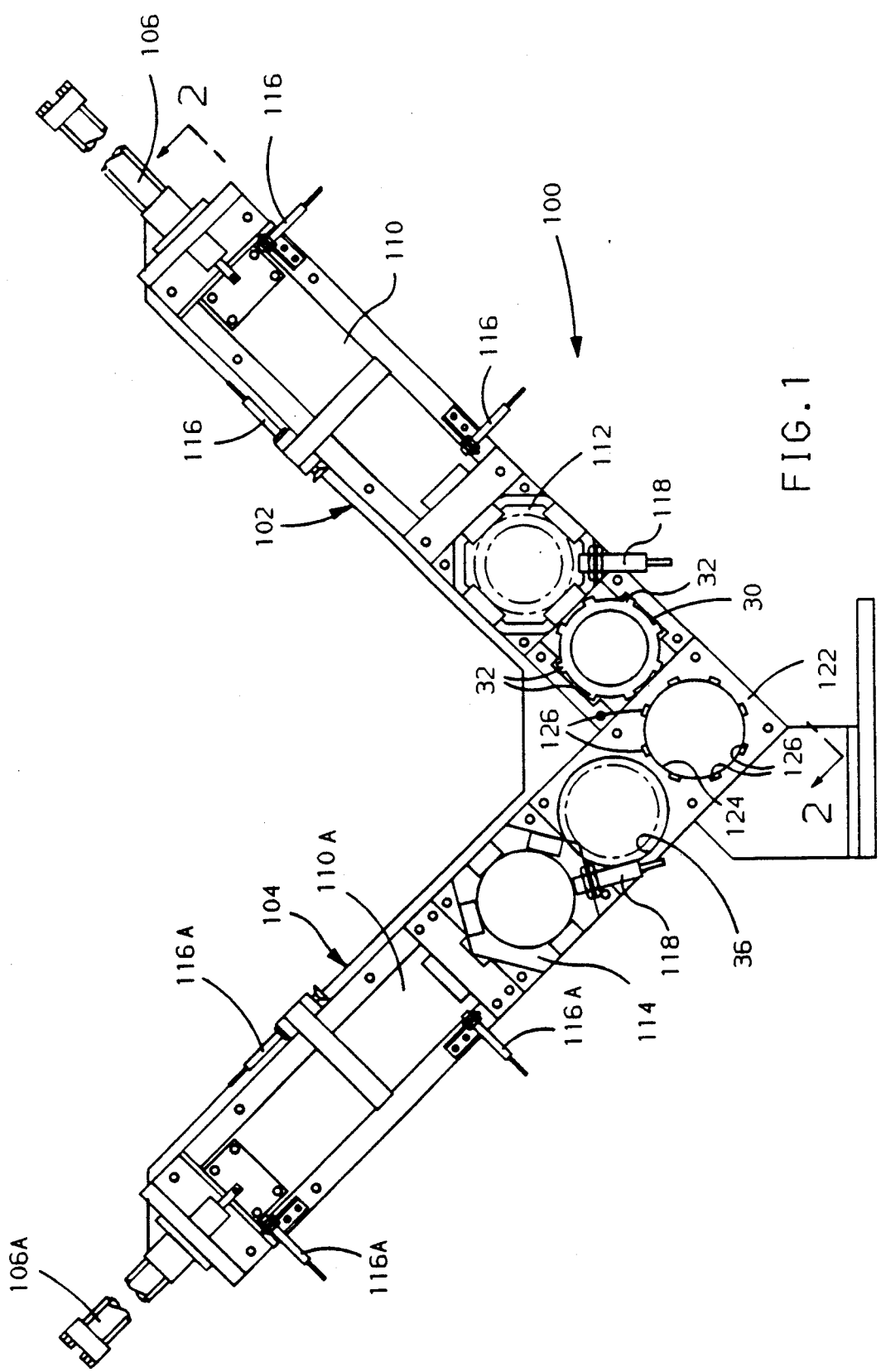
FIG. 1 is a top view of a machine which may be utilized to perform the subject invention.
Figure 2:
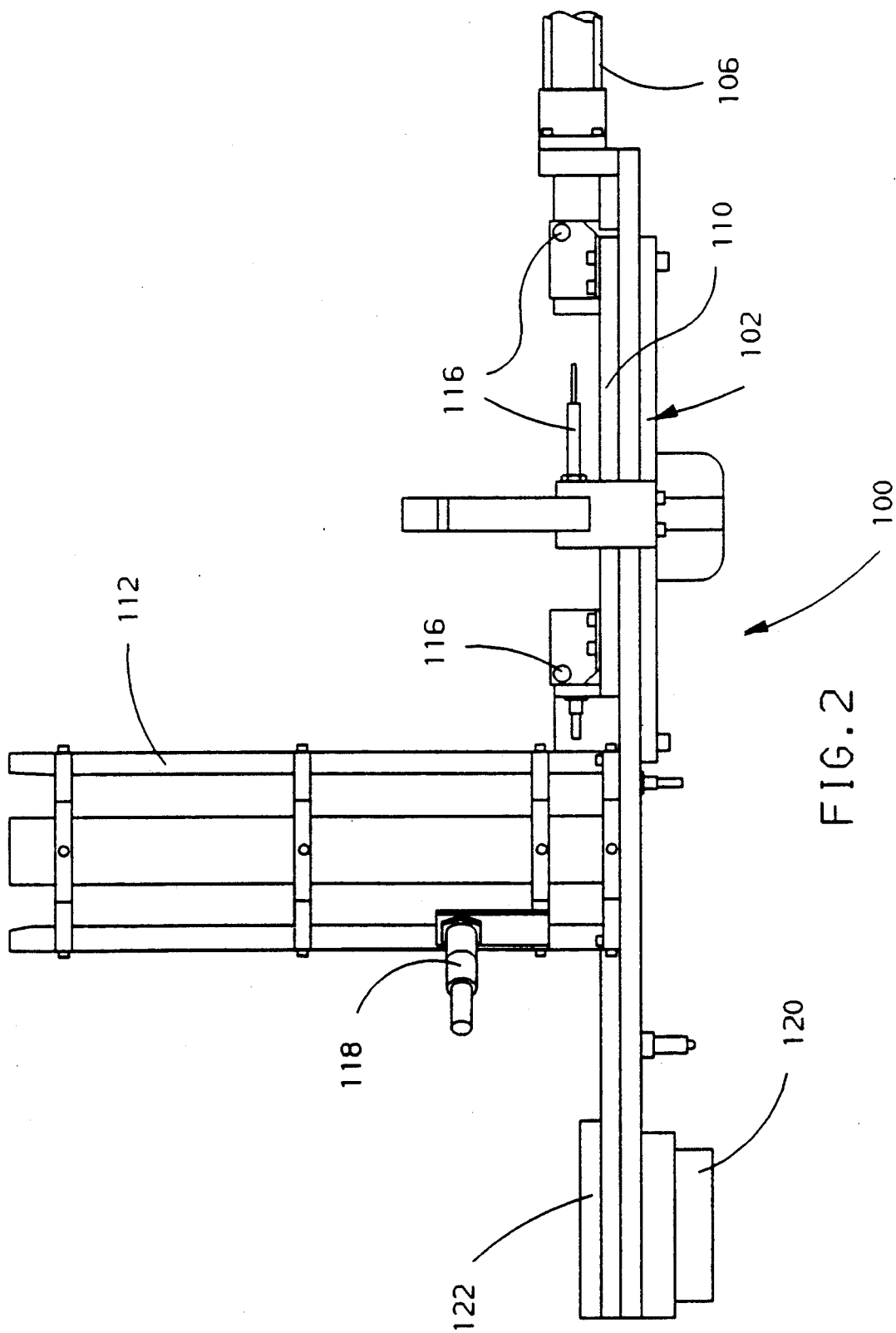
FIG. 2 is an elevational view taken along line 2—2 of FIG. 1.
Figure 3:
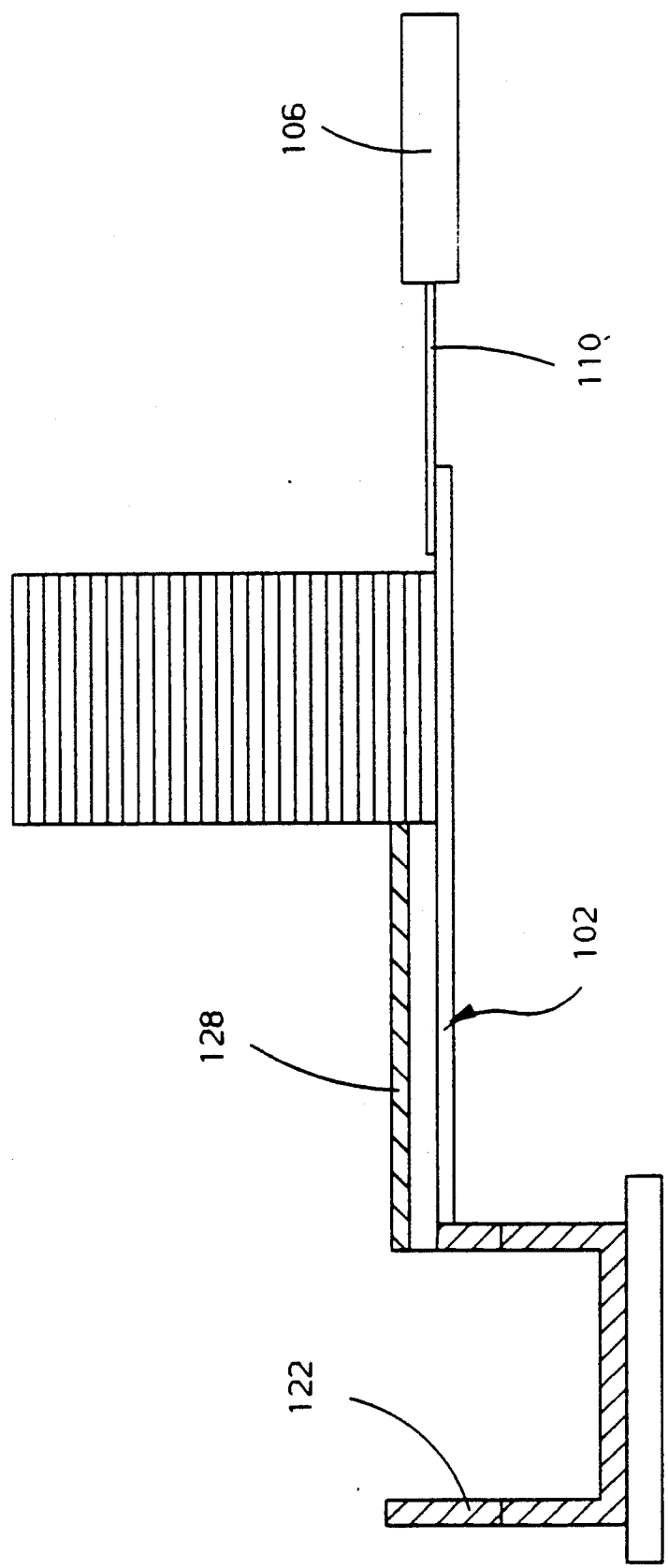
FIG. 3 is a diagrammatic representation of the machine shown in FIGS. 1 and 2.

The clutches shown in FIGS. 4 and 5 are assembled, at least in part, by the mechanisms shown in FIGS. 1 through 3. In FIGS. 1 and 2, there is seen a clutch assembly machine 100 which includes a pair of arms 102 and 104 disposed at right angles. Each arm 102 and 104 has a power cylinder 106 and 106A which are operatively connected to slide plates 110 and 110A. Each arm 102 and 104 also has a vertically extending stack 112 and 114, respectively. The stack 112 is designed to contain clutch plates that are externally splined, such as the clutch plates 30. The stack 114 is designed to house internally splined plates such as clutch plates 34.

Each arm 102 and 104 has a plurality of sensors 116-116A which are utilized to determine the position of the slide member 110-110A. Each stack 112 and 114 has at least one sensor 118 which is utilized to determine the number of clutch plates remaining in the respective stack. The intersection of the arms 102 and 104 is provided with a base 120 to which is secured an assembly ring 122 which has formed therein an opening 124. The opening 124 has a plurality of splines 126 formed therein which are complimentary to the splines 32 formed on the plates 30.

A conveyor mechanism, not shown, is adapted to deliver clutch housings, such as 12 or 54, to a position in which the spline 26 or 60 are aligned with the splines 126. The piston 22 and pressure plate 28 can be installed in the housing either before or during alignment of the housing with the assembly ring 122. Since there is sufficient time while the housing is resting on the conveyor away from the assembly ring to install the piston and pressure plate, this is the preferred installation time. It should also be recognized that only one half of the clutch assembly 52 will be assembled during registry with the assembly ring 122.

When the clutch housing 12 or 54 has been aligned with the assembly ring 122, the power cylinder 106A on arm 104 will be actuated to cause the slide plate 110A to move the bottom plate of stack 114 along the arm 104 until vertical registry with the opening 124 in the ring 122 is attained. After vertical registration is attained, the plates 34 will descend by gravity on top of the pressure plate 28. The power cylinder 106A and slide plate 110A are then retracted.

After the clutch plate 34 is installed and the power cylinder 106A is retracted, the power cylinder 106 is energized to cause the slide plate 110 on arm 102 to slide the bottom plate 30 of the stack 112 into vertical registry with the assembly ring 122. When this registry has been attained, the plates 30 will descend by gravity into the housing 12 or 54 on top of plate 34. The plates 34, 30 are alternately slid from the bottom of the respective stacks 114, 112 until the total number of desired plates has been installed in the clutch housing. The clutch assembly shown in FIGS. 4 and 5 include two externally toothed plates 30 and three internally toothed plates 34.

After the final friction plate 34 has been installed, the backing plate 38 and return spring assembly 42, 68 or 70 is installed. In the alternative, the clutch housing with the friction plates installed can be moved to a separate assembly location for the installation of the backing ring and return spring assembly.

With the dual clutch assemblies, such as those shown at 52, the housing would be inverted, after the return spring assembly is installed, and returned to the conveyor for re-registration to the assembly ring, whereby the other half of the clutch 52 can be assembled.

FIG. 3 is a simplified view of the operation in which it can be seen that the slide plate 110-110A will engage the bottom plate of a stack to move it linearly or slide it across the respective arm for registry with the assembly ring 122. In order to maintain the plates in the proper linear path, guide rails 128 are provided.

The embodiments of the invention in which an exclusive property or privilege is claimed are defined as follows:

1. A method of assembling a clutch mechanism comprising:

providing a housing having an internally toothed peripheral cylindrical wall, an end wall and an axial facing opening;

installing a piston in said housing adjacent said end wall;

positioning said housing in a fixture with said axial facing opening being oriented upward;

providing a stack of externally toothed clutch plates in a fixture with each clutch plate having a toothed outer periphery complimentary to the toothed wall of said housing;

providing a substantially cylindrical assembly ring on said housing with a toothed inner wall aligned with the toothed wall of said housing and thereby defining an opening therein facing said stack of clutch plates;

sliding the bottom clutch plate from said stack into vertical registration with said assembly ring with said toothed outer periphery thereof aligned with said opening of said ring and said housing and thereby causing said clutch plate to descend solely by the force of gravity into said housing with said complimentary toothed wall and periphery in meshing engagement;

inserting an internally toothed clutch plate on top said externally toothed clutch plate; and alternately inserting said plates until desired number of clutch plates has been installed.

2. The invention defined in claim 1 further comprises installing a pressure plate in said housing on top of said piston; removing said housing from said ring; installing a return spring assembly in said housing and securing same with a lock ring; and installing a backing plate in said adjacent the last installed clutch plate and securing the same with a lock ring.

3. A method of claim assembling a clutch mechanism comprising:

providing a housing having an internally toothed peripheral cylindrical wall, an end wall and an axial facing opening;

installing a piston in said housing adjacent said end wall;

positioning said housing in a fixture with said axial facing opening being oriented upward;

providing a stack of externally toothed clutch plates in a fixture with each clutch plate having a toothed outer periphery complimentary to the toothed wall of said housing;

providing a stack of internally toothed clutch plates in a fixture, each plate having an outer diameter;

providing a substantially cylindrical assembly ring on said housing having an inner diameter with a toothed inner wall aligned with the toothed wall of said housing and thereby defining an opening therein facing each of said stacks of clutch plates;

sliding the bottom clutch plate from said stack of externally toothed plates into vertical axial registration with said assembly ring with said toothed periphery aligned with said opening of said ring and said housing and thereby causing said clutch plate to descent solely by the force of gravity into said housing with said complimentary toothed wall and periphery in meshing engagement;

sliding the bottom clutch plate from said stack of internally toothed plates into vertical axial registration with said assembly ring with said outer diameter being substantially aligned with said opening of said ring and said housing and thereby causing said clutch plate to descend solely by the force of gravity into said housing on top said externally toothed plate; and alternately installing said plates is said housing by sliding the bottom plate from the respective stack until the desired number of clutch plates has been installed.

4. The invention defined in claim 3 further comprises installing a pressure plate in said housing on top of said piston; removing said housing from said ring; installing a return spring assembly in said housing and securing same with a lock ring; and installing a backing plate in said adjacent the last installed clutch plate and securing the same with a lock ring.

5. A method of assembling a clutch mechanism comprising:

providing a housing having an internally toothed peripheral cylindrical wall, an end wall and an axial facing opening;

installing a piston in said housing adjacent said end wall;

positioning said housing in a fixture with said axial facing opening being oriented upward;

providing a stack of externally toothed clutch plates in a fixture with each clutch plate having an outer diameter with a toothed outer periphery complimentary to the toothed peripheral inner cylindrical wall of said housing;

providing a stack of internally toothed clutch plates in a fixture, each plate having a substantially smooth outer periphery complimentary to the cylindrical surface of the toothed peripheral inner cylindrical wall;

providing a substantially cylindrical assembly ring on said housing having an inner diameter with a toothed inner wall aligned with the toothed wall of said housing and thereby defining an opening therein facing each of said stacks of clutch plates;

sliding the bottom clutch plate from one of said stacks of clutch plates into vertical axial registration with said assembly ring with said outer periphery thereof being aligned with said opening of said ring and said housing and thereby causing said clutch plate to descend solely by the force of gravity into said housing internally to said complimentary toothed wall;

sliding the bottom clutch plate from the other of said stacks of clutch plates into said assembly ring in vertical axial registration with said housing to substantially align said outer periphery with the opening of said ring and said housing and thereby causing said clutch plate to descend solely by the force of gravity into said housing on top said previously installed one clutch plate; and alternately installing said plates by sliding the bottom plate from the respective stack into said ring in vertical registration with said housing until the desired number of clutch plates has been installed in said housing.

6. The invention defined in claim 5 further comprises installing a pressure plate in said housing on top of said piston; removing said housing from said ring; installing a return spring assembly in said housing and securing same with a lock ring; and installing a backing plate in said adjacent the last installed clutch plate and securing the same with a lock ring.

* * * * *